United States Patent Office 3,236,622
Patented Feb. 22, 1966

1

2

3,236,622
PESTICIDAL COMPOSITION

Gilbert Spencer Hartley, Fulbourn, and Roynon Howes, Saffron Walden, England, assignors to Fisons Pest Control Limited, Harston, Cambridgeshire, England, a British company No Drawing. Filed June 29, 1962, Ser. No. 206,179
The portion of the term of the patent subsequent to May 19, 1981, has been disclaimed
Claims priority, application Great Britain, July 8, 1961, 24,782/61
15 Claims. (Cl. 71—2.5)

The present invention concerns an improvement in agricultural chemical compositions.

In our U.S. Patent No. 2,907,691 is described a composition containing an agricultural chemical which is insoluble or slightly soluble in water which also contains a compound comprising the salt of trimethylamine or triethylamine and a long chain saturated aliphatic carboxylic acid or an unsaturated aliphatic carboxylic acid with at least two double bonds. These compounds act both as dispersing agent and sticking agent.

It has now been found that where the source of the spray of the agricultural chemical is some distance from the target, as for example with spraying from an aircraft or spraying upwards from a ground based mist blower, by incorporating in the composition a volatile base and a long chain saturated aliphatic acid, droplets of these compositions can exhibit sufficiently delayed evaporation to reach the target in a liquid condition even in arid climates. The mixture of the volatile base and the acid acts also as dispersing agent and sticking agent.

For satisfactory control of evaporation it is necessary that the fatty acids be predominantly saturated. Unsaturated acids like oleic or linoleic do not have a worthwhile effect and, if present as impurities to any substantial extent, reduce the effect of the saturated acids. The effect is also reduced by the incorporation of many well known types of surface active compounds and where it is necessary for additional surface active compounds to be present to control flocculation, sedimentation, etc., compounds where the hydrophilic property is derived from condensed alkylene oxide are preferred.

It has now been found that particularly advantageous results are obtained by the use of a saturated fatty acid together with an amine seleceted from the group consisting of dipropyl amines, mono-hexyl amines and methyl diethyl amines, in the presence of one or more aliphatic alcohols of 3–5 carbon atoms and, in some cases, water. Such a composition possesses the advantages firstly that it will not solidfy, except at very low temperatures, and secondly that it is sufficiently soluble in water to avoid the formation of a separate liquid phase when the composition is diluted with water for spraying.

Accordingly the present invention is for a composition containing an amine selected from the group consisting of di-normal propylamine, di-isopropylamine, hexyl amines and methyl diethyl amine, a saturated aliphatic carboxylic acid of at least 13 carbon atoms and one or more aliphatic alcohols of 3–5 carbon atoms. The hexyl amine may be normal hexyl amine or a branched chain hexyl amine. According to a preferred embodiment of the invention the composition also contains water.

The present invention is also for an agricultural composition which contains a composition as defined above together with an agricultural chemical.

The compositions according to the present invention may comprise, where appropriate, aqueous suspensions or solutions containing the agricultural chemical and other components as identified, suitably diluted for spraying on to a crop. The compositions may also be concentrates for storage and sale which may be in the form of more or less stiff pastes intended to be diluted to spray strength on the spot. The compositions of the invention may of course contain in addition inert diluents and other compounds common in spray liquids such as suspending agents, anti-flocculants and the like.

Owing to the low viscosiy of the mixtures of these amines with the fatty acids, for example stearic acid, and of aqueous or alcoholic solutions thereof, it is not usually practicable to supply a liquid concentrate of a water insoluble agricultural chemical, since the insoluble agricultural chemical sediments in storage and, after a considerable period, can only with difficulty be resuspended.

In such cases therefore, the amine fatty acid mixture is preferably provided as a separate liquid concentrate in one pack and the agricultural chemical, for example as a fine powder, in another, to be mixed together with water immediately prior to spraying.

The agricultural chemical may comprise a fungicide, pesticide, herbicide, plant growth regulant or other chemical used to ensure plant health, and may be water soluble or water insoluble. However the invention is of particular advantage in the case of agricultural chemicals which are insoluble or substantially insoluble in water. Examples of agricultural chemicals which may be mentioned include fungicides, such as fungicidal copper compounds, for example cuprous oxide, copper hydroxide and copper oxychloride; nickel fungicides, for example nickel hydroxide; the organo sulphur fungicides, for example tetramethylthiuram disulphide and divalent metal salts, such as zinc and manganese of ethylene-bis-dithiocarbamic acid; insecticides, such as a dried culture of *B. thuringiensis* or related strains or species, DDT, BHC, sevin (alpha naphthyl ester of N-methyl carbamic acid), aldrin, dieldrin, bis-N;N;N′N′-tetramethylphosphorodiamidic anhydride, and O,O-dimethyl-S-(N-methyl-carbamoyl-methyl) phosphorodithioate; or herbicides, such as N-parachlorophenyl-N′N′-dimethylurea, simazin (bismonoethylamino-chloro-s-triazine and atrazine (chloromonoethylamino-mono-iso-propylamino-s-triazine) or mixtures of any of the above together with other materials.

The saturated aliphatic carboxylic acid of at least 13 carbon atoms is desirably solid at normal temperatures and preferably contains 14–22 carbon atoms in the chain. Suitable acids include myristic acid, palmitic acid, stearic acid, arachidic acid and behenic acid. The long chain saturated aliphatic carboxylic acid is preferably stearic acid. If desired, mixtures of any of these acids may also be used, and in any event the commercial products normally comprise mixtures.

The amine may be used in proportions over a wide range comprising stoichiometric or greater or less proportion than stoichiometric, for example comprising 50–500% of the stoichiometric equivalent. It is preferred to use the amine in amount comprising 5–100% excess over the stoichiometric equivalent.

The aliphatic alcohol may comprise isopropyl alcohol, normal butyl alcohol, secondary butyl alcohol, or secondary amyl alcohol (pentanol-2) or mixtures of any of these alcohols together or with other alcohols. However it is preferred that the alcohol should comprise a branched chain compound and according to a preferred embodiment of the invention the alcohol is tertiary butyl alcohol, isobutyl alcohol, tertiary amyl alcohol or isoamyl alcohol or mixtures thereof.

The amount of alcohol employed may vary over a wide range, and for example may comprise 25–200% of the amine-acid mixture, and preferably 50–100% by weight of the amine-acid mixture. The amount of water employed may also vary over a wide range, and for example may comprise 0–200% of the amine-acid mixture, and preferably 0–50% by weight of the amine-acid mixture. In general however water is incorporated in the composition only where this is necessary to obtain a fluid composition for storage, and the amount is the minimum required to give the desired fluidity.

The solution of the amine and the long chain aliphatic acid may be used for spraying in water with the agricultural composition at rates over a wide range, for example in amount comprising 1–100% and perferably from 2–50% by weight of the weight of the agricultural chemical. It is preferred normally to incorporate the said salt in amount comprising 5–20% by weight of the weight of the agricultural chemical.

The agricultural chemical composition according to the present invention, diluted with up to 200 times its weight of water confers the property of delayed evaporation together with absence of undesirable frothing. These diluted compositions may be sprayed at a rate as low as 1 gallon per acre from normal aircraft spraying systems and yet reach the ground in a liquid condition even in arid climates. Additionally the efficiency of treatment of the crop with the agricultural chemical is greatly enhanced by reason of the improved adhesion of the product.

It is possible to incorporate in the agricultural chemical composition the usual adjuvants, but it is to be noted that the addition of further wetting agents interferes with the control of evaporation. Materials which have been found not to interfere comprise surface active compounds which derive their hydrophilic property from condensed alkylene oxide such as compounds of the alkylene oxide block polymer type, for example comprising block polymers of ethylene oxide and propylene oxide (such as for example the commercially available material Pluronic L61) or of the alkylene oxide complex type comprising for example simple ethylene oxide non-ionic surface active compounds such as octylcresol polyethylene oxide, or dodecyl alcohol polyethylene oxide with 5–20 ethylene oxide units per hydrophobic unit or nonyl phenol polyethylene oxide (such for example as the commerically available material Lissapol N).

The following examples are given to illustrate the present invention. The parts and percentages are by weight unless otherwise indicated.

*Example 1*

A mixture was prepared from 27.6% di-normal propyl amine, 39.1% stearic acid, 25% isobutyl alcohol and 8.3% tertiary butyl alcohol. This mixture had a cloud point of −13° C. and was therefore satisfactory under most storage conditions.

When 3 parts of this mixture was dissolved in water, 12 parts of finely divided copper oxychloride added and the whole made up to 100 parts by the addition of water, a very stable suspension was obtained.

This suspension was sprayed from aircraft at a rate of 2 gallons per acre and the copper formed an adherent deposit on the plants.

In an analogous mixture without the isobutyl alcohol and tertiary butyl alcohol, the cloud point was 25° C., and the mixture was semi-solid at 20° C.

*Example 2*

A mixture was prepared from 20.7% di-isopropyl amine, 29.3% stearic acid, 37.5% isobutyl alcohol and 12.5% tertiary butyl alcohol. This mixture had a cloud point of +12.5° C., and consequently would be unusable in cold climates. The addition of 2.5 parts of water to 17.5 parts of the mixture reduced the cloud point to −12° C.

When 5 parts of this mixture were dissolved in water, 15 parts of finely divided 75% sevin (the remainder being mineral diluent to facilitate grinding) added and the whole made up to 100 parts with water, a very stable suspension was obtained.

This suspension was sprayed from aircraft at a rate of 2 gallons per acre; the sevin formed an adherent deposit on the plants.

In an analogous mixture without the isobutyl alcohol and tertiary butyl alcohol, the cloud point was 35° C.

*Example 3*

A mixture was prepared from 2 parts of normal hexylamine, 5 parts of palmitic acid, 2 parts of tertiary amyl alcohol and 1 part of water. This mixture had a cloud point of 13–14° C., and was still fluid at 10° C.

For comparison in an analogous mixture without the alcohol and water, the setting point was 40° C.

*Example 4*

A mixture was prepared from 2 parts of methyldiethylamine, 7 parts of behenic acid and 6 parts of secondary butyl alcohol. This mixture had a cloud point of 5° C.

For comparison in an analogous mixture without the alcohol, the setting point was 31° C.

*Example 5*

7 parts of the mixture according to Example 3 were dissolved in water and 20 parts of 50% atrazine (the remainder being mineral diluent to facilitate grinding) added and the whole made up to 100 parts with water giving a very stable suspension. When sprayed from aircraft at a rate of 2 gallons per acre a very adherent deposit was formed on the plants.

*Example 6*

2 parts of the mixture according to Example 4 were dissolved in water and 5 parts of a dried culture of Bacillus thuringiensis added and the whole made up to 100 parts with water giving a very stable suspension. When sprayed from aircraft at a rate of 2 gallons per acre a very adherent deposit was formed on the plants.

The exemplified alcohols, acids, amines and agricultural chemicals can be respectively replaced by any of those listed in the disclosure with comparable results.

We claim:

1. A composition containing an agricultural pesticidal chemical in a pesticidally effective amount, an amine selected from the group consisting of di-normal propyl amine, di-isopropyl amine, hexyl amines and methyl diethyl amine, a saturated aliphatic carboxylic acid of 14 to 22 carbon atoms and at least one aliphatic alcohol of 3–5 carbon atoms, said amine being present in an amount comprising 50–500% of the stoichiometric equivalent to said carboxylic acid.

2. A composition as claimed in claim 1 wherein the saturated aliphatic carboxylic acid is stearic acid.

3. A composition as claimed in claim 1 wherein the alcohol is selected from the group consisting of tertiary butyl alcohol, isobutyl alcohol and isoamyl alcohol.

4. A composition as claimed in claim 1 which also contains water.

5. A composition as claimed in claim 1 which also contains a surface active compound which derives its hydrophilic property from condensed alkylene oxide.

6. A composition containing an agricultural pesticidal chemical in a pesticidally effective amount, an effective amount of an amine selected from the group consisting of di-normal propyl amine, di-isopropyl amine, hexyl amines and methyl diethyl amine, an effective amount of a saturated aliphatic carboxylic acid of 14 to 22 carbon atoms and at least one aliphatic alcohol of 3–5 carbon atoms.

7. A composition as claimed in claim 6 wherein the saturated aliphatic carboxylic acid is stearic acid.

8. A composition as claimed in claim 6 wherein the alcohol is selected from the group consisting of tertiary butyl alcohol, isobutyl alcohol and isoamyl alcohol.

9. A composition as claimed in claim 6 which also contains water.

10. A composition as claimed in claim 6 which also contains a surface active compound which derives its hydrophilic property from condensed alkylene oxide.

11. A composition as claimed in claim 6 wherein the amine is present in amount comprising 5–100% excess over the stoichiometric equivalent.

12. A composition as claimed in claim 6 wherein the aliphatic alcohol is present in amount comprising 25–200% of the amine-acid mixture.

13. A composition as claimed in claim 6 wherein the aliphataic alcohol is present in amount comprising 50–100% of the amine-acid mixture.

14. A composition as claimed in claim 6 wherein the amine-acid mixture is present in amount comprising 1–100% by weight of the agricultural pesticidal chemical.

15. A composition as claimed in claim 6 wherein the amine-acid mixture is present in amount comprising 5–20% by weight of the agricultural pesticidal chemical.

References Cited by the Examiner
UNITED STATES PATENTS

| | | | |
|---|---|---|---|
| 2,558,762 | 7/1951 | Kohr | 71—2.6 |
| 2,907,691 | 10/1959 | Hartley et al. | |
| 3,133,809 | 5/1964 | Hartley et al. | 71—2.6 X |

LEWIS GOTTS, *Primary Examiner.*